(12) United States Patent
Kraemer et al.

(10) Patent No.: US 9,970,390 B2
(45) Date of Patent: May 15, 2018

(54) SYSTEMS AND METHODS FOR REMOVING COKING DEPOSITS IN A FUEL INJECTION SYSTEM

(71) Applicant: Ford Global Technologies, LLC, Dearborn, MI (US)

(72) Inventors: Frank Kraemer, Neunkirchen-Seelscheid (DE); Klemens Grieser, Langenfeld (DE); Kay Hohenboeken, Cologne (DE); Jens Wojahn, Bergisch Gladbach (DE); Oliver Berkemeier, Bergisch Gladbach (DE)

(73) Assignee: Ford Global Technologies, LLC, Dearborn, MI (US)

(*) Notice: Subject to any disclaimer, the term of this patent is extended or adjusted under 35 U.S.C. 154(b) by 47 days.

(21) Appl. No.: 15/137,765

(22) Filed: Apr. 25, 2016

(65) Prior Publication Data

US 2017/0306892 A1 Oct. 26, 2017

(51) Int. Cl.
*F02M 25/028* (2006.01)
*F02M 65/00* (2006.01)

(52) U.S. Cl.
CPC ........ *F02M 25/028* (2013.01); *F02M 65/008* (2013.01)

(58) Field of Classification Search
CPC .............................. F02M 25/028; F02M 65/08
See application file for complete search history.

(56) References Cited

U.S. PATENT DOCUMENTS

| | | | |
|---|---|---|---|
| 4,125,092 A | 11/1978 | Inamura | |
| 4,141,323 A | 2/1979 | Hart | |
| 4,408,573 A | 10/1983 | Schlueter et al. | |
| 4,965,052 A * | 10/1990 | Lowther | .................... B01J 3/08 123/1 A |
| 5,941,208 A * | 8/1999 | Biemelt | .............. F02D 41/3029 123/169 CL |
| 6,637,382 B1 | 10/2003 | Brehob et al. | |
| 6,698,387 B1 | 3/2004 | McFarland et al. | |
| 6,866,031 B2 * | 3/2005 | Spiegel | ..................... F01L 1/32 123/188.1 |
| 6,892,691 B1 * | 5/2005 | Uhl | ........................ F02B 77/04 123/198 A |
| 7,065,955 B2 | 6/2006 | Reback et al. | |

(Continued)

FOREIGN PATENT DOCUMENTS

DE 3633949 A1 4/1988
DE 19622947 A1 8/1998

(Continued)

*Primary Examiner* — Long T Tran
(74) *Attorney, Agent, or Firm* — Julia Voutyras; McCoy Russell LLP

(57) ABSTRACT

Methods and systems are provided for reducing coking deposits in a fuel injection system. In one example, a method may comprise humidifying intake air of an intake system of an engine in response to a determination that fuel injector coking is occurring, or after a duration has passed since a most recent humidification event. A humidifying fluid, such as water, may be injected into the intake system to humidify the intake air, and the resulting humidified intake air may reduce and/or remove coking deposits on one or more direct fuel injectors of the fuel injection system.

17 Claims, 5 Drawing Sheets

(56) References Cited

U.S. PATENT DOCUMENTS

| | | | |
|---|---|---|---|
| 7,080,624 B2 * | 7/2006 | Britsch | F02D 41/402 123/295 |
| 7,715,976 B1 * | 5/2010 | Xiao | F02M 26/46 123/406.48 |
| 8,051,637 B2 * | 11/2011 | Labrador | F01K 27/00 60/39.01 |
| 2004/0255422 A1 | 12/2004 | Reback et al. | |
| 2007/0266995 A1 * | 11/2007 | Ha | F02M 25/10 123/445 |
| 2012/0316760 A1 * | 12/2012 | Grieser | F02B 23/101 701/108 |
| 2014/0020362 A1 * | 1/2014 | Warey | F01N 3/08 60/274 |
| 2014/0090609 A1 * | 4/2014 | Tsai | F01P 7/14 123/41.21 |

FOREIGN PATENT DOCUMENTS

| | | | |
|---|---|---|---|
| DE | 19945813 A1 | 3/2001 | |
| DE | 10117507 A1 | 10/2002 | |
| DE | 102014100307 A1 | 7/2014 | |
| JP | H09313891 A | 12/1997 | |

\* cited by examiner

SYSTEMS AND METHODS FOR REMOVING COKING DEPOSITS IN A FUEL INJECTION SYSTEM

TECHNICAL FIELD

The present application relates to systems and methods for removing coking deposits from a fuel injection system of an internal combustion engine.

BACKGROUND AND SUMMARY

During operation of a direct-injection Otto-cycle engine, injection nozzles inject fuel into one or more combustion chambers to achieve a desired air/fuel ratio (e.g., stoichiometric mixture). However, coking or carbon deposition, may occur on the fuel injectors, leading to a narrowing of the fuel injector orifices. Specifically, carbonaceous deposits may form on a closing body and/or on a valve seat of an injection valve. The deposits can partially and in some examples, completely block the orifices of the fuel injectors, reducing an amount of fuel that is injected into the combustion chambers. This in turn can lead to increased particle emissions of the Otto-cycle engine.

Some example approaches aimed at reducing injector coking include injecting an agent that dissolves the coking deposits. For example, DE 101 17 507 A1 discloses a method for, during operation of the Otto-cycle engine, injecting a coke-dissolving agent into an intake duct of the Otto-cycle engine.

However, the inventors of the present application have recognized problems with the above approaches. For example, coking of injection nozzles of an Otto-cycle engine may occur more intensely if the Otto-cycle engine is often operated in a part-load range. At high loads and at full load, deposits on the injection valves are partially burned off or are partially spalled from the injection valves owing to thermal effects. However, if the engine is continually operated in a part-load range, coking deposits may accumulate and increase emissions, and reduce engine performance. In another example, the coke-dissolving agent may also be used as a knock control fluid, and may be injected into the engine cylinders to reduce and/or prevent engine knock. However, the inventors herein have recognized that the coke-dissolving agent may become depleted with frequent injections into the intake, and thus may not be available when needed for engine knock control/prevention.

The inventors herein have devised systems and methods for addressing the issues described above. In one example, the issues described above may be addressed by a system for removing coking deposits from at least one injection nozzle of an Otto-cycle engine, the at least one injection nozzle configured to inject fuel directly into a combustion chamber of the Otto-cycle engine, where the Otto-cycle engine receives intake air via at least one intake unit which serves exclusively for conducting intake air, and where the at least one intake unit includes a humidification unit, which when activated, humidifies intake air flowing through the at least one intake unit with water.

In another representation, the issues described above may be addressed by a method for removing coking deposits from at least one injection nozzle of an Otto-cycle engine, by means of which at least one injection nozzle a fuel can be injected directly into a combustion chamber of the Otto-cycle engine, comprising temporarily humidifying intake air of the Otto cycle engine with water during operation of the Otto-cycle engine.

In yet another representation, the issues described above may be addressed by a method comprising humidifying intake air of an intake system of an engine in response to a determination that fuel injector coking is occurring, or after a duration has passed since a most recent humidification event.

In this way, by humidifying the intake air supplied to one or more combustion chambers of the engine system, coking deposits on one or more direct fuel injectors may be reduced. As such, fuel injection capabilities of the injectors may be increased, and a more accurate amount of fuel may be injected into the combustion chambers. Thus, emissions may be reduced, and an amount of power output by the engine system may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
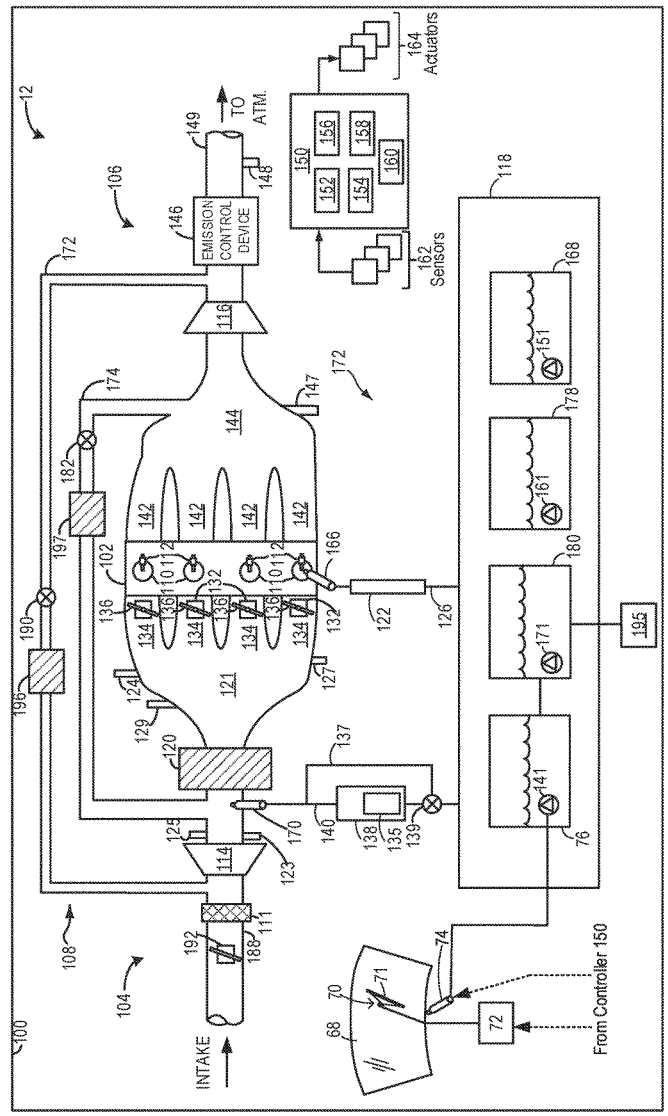
FIG. 1 shows a schematic diagram of an engine system including a fuel system, in accordance with one or more embodiments of the present disclosure.
Figure 2:
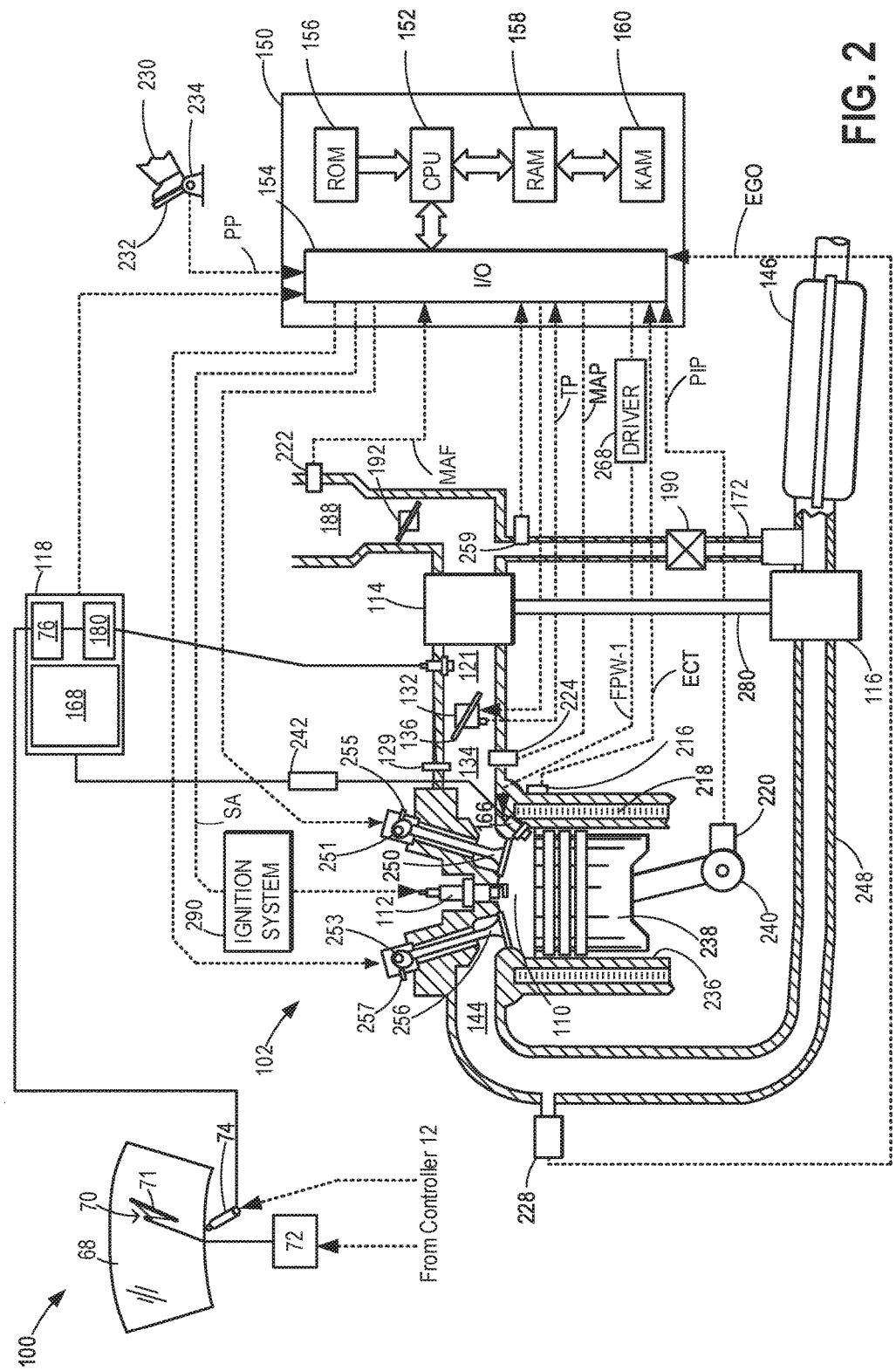
FIG. 2 shows a schematic diagram of a single combustion chamber of the engine system of FIG. 1, in accordance with one or more embodiments of the present disclosure.
Figure 3:
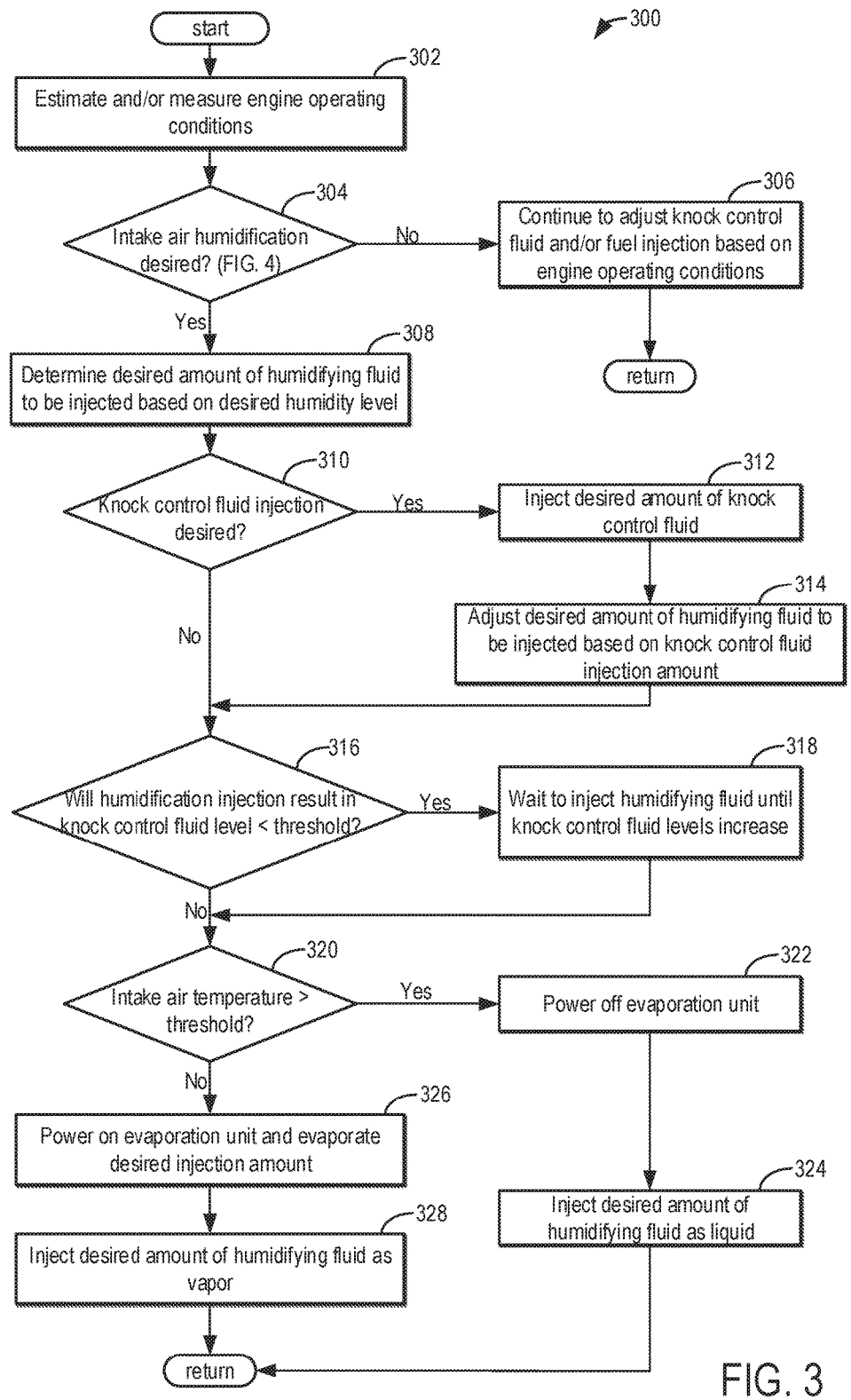
FIG. 3 shows a flow chart of an example method for removing coking deposits in a fuel system, in accordance with one or more embodiments of the present disclosure.

The present disclosure relates to systems and methods for removing coking deposits from at least one injection nozzle of an Otto-cycle engine. An example engine system is shown in FIGS. 1 and 2, including a fuel system with at least one injection nozzle. To remove coking deposits from the at least one injection nozzle, a humidifying fluid may be injected into the intake system of the engine and/or directly into one or more combustion chambers of the engine. FIG. 3 shows an example method for humidifying the intake air using the humidifying fluid. By humidifying the intake air, coking deposits may be removed from the at least one injection nozzle. The timing and/or scheduling of the humidifying fluid injection may be determined based on amount of injector coking as described in the example method of FIG. 4. Further, humidifying fluid may be sourced from a condensation unit such as an EGR cooler, as described in the example method of FIG. 5.

FIG. 1 shows a schematic depiction of a vehicle 100 including an engine system 12, the engine system 12 including an engine 102, an intake system 104, an exhaust system 106, a fuel system 118, and an exhaust gas recirculation (EGR) system 108. The intake system 104 is configured to provide intake air to cylinders 110 of the engine 102. Cylinders 110 may also be referred to herein as combustion chambers 110. The engine 102 is depicted as having 4 cylinders arranged in an inline configuration. However, it will be appreciated that the number of cylinders and/or configuration of the cylinders 110 may be altered in other embodiments. For example, the engine 102 may include 6 cylinders arranged in a V configuration. The intake system 104 is configured to flow intake air to the cylinders 110 and the exhaust system 106 is configured to receive exhaust gas from the cylinders 110. Additionally, each of the cylinders 110 may include an ignition device 112, such as a spark plug, configured to ignite an air fuel mixture in the cylinders 110. In the description herein, ignition device 112 may also be referred to as spark plug 112. Additionally or alternatively, compression ignition may be utilized to ignite the air fuel mixture in the cylinders 110. The engine 102 also includes at least one intake and exhaust valve per cylinder.

Fresh air entering the vehicle 100 may enter the engine system 12 via an intake conduit 188 and may flow through air cleaner 111 en route to intake manifold 121. The intake system 104 may in some examples include a compressor 114 positioned in the intake conduit 188. Fresh air may be introduced along intake conduit 188 via air cleaner 111 and towards compressor 114. As such, air entering the engine system 12 may be forced through the air cleaner 111 before flowing to intake manifold 121 and cylinders 110 of the engine 102. The air cleaner 111 may also be referred to herein as air filter 111, and may filter particulate matter and/or purify the air supplied to the engine 102.

A throttle valve 192 may also be positioned in the conduit 188 for regulating an amount of airflow provided to the compressor 114 and cylinders 110. Specifically, the throttle valve 192 may be adjusted between an open first position and a closed second position, where an opening formed by the valve 192, and thus an amount of gasses flowing through the valve 192, may increase with increasing deflection of the valve 192 away from the second position towards the open first position.

The compressor 114 may be included in a turbocharger having a turbine 116 in the exhaust system 106. The compressor 114 and the turbine 116 may be rotatably coupled. However, in other examples the compressor 114 may be rotatably coupled to a transmission in the vehicle, providing what is referred to as supercharging.

The intake system 104 further includes a charge air cooler (CAC) 120, positioned downstream of the compressor 114. The charge air cooler may be used to cool intake air which may be heated via operation of the compressor 114 and the EGR gas delivered to the intake system 104 upstream of the CAC 120. The charge air cooler 120 may be a water-to-air charge cooler and may use coolant to cool intake air. However, in other examples the charge air cooler 120 may be an air-to-air charge cooler and may utilize ambient air to cool the intake air. Thus, after being pressurized and/or heated by the compressor 114, boosted intake air may then flow through the charge air cooler 120 to be cooled before being delivered to the cylinders 110.

In the embodiment shown in FIG. 1, the pressure of the air charge within the intake manifold 121 may be sensed by manifold air pressure (MAP) sensor 127 and a boost pressure may be sensed by boost pressure sensor 123. However in some examples sensor 127 and/or sensor 123 may not be included in the engine system 12. A compressor by-pass valve (not shown) may be coupled in series between the inlet and the outlet of compressor 114. The compressor by-pass valve may be a normally closed valve configured to open under selected operating conditions to relieve excess boost pressure. For example, the compressor by-pass valve may be opened during conditions of decreasing engine speed to avert compressor surge.

Additional sensors such as manifold charge temperature (MCT) sensor 124 and air charge temperature sensor (ACT) 125 may be included to determine the temperature of intake air at the respective locations of the sensors 124 and 125 in the intake system 104. However, in other examples, sensor 124 and/or sensor 125 may not be included in the engine system 12. In some examples, the MCT and the ACT sensors, 124 and 125 respectively, may be thermistors and the output of the thermistors may be used to determine the intake air temperature at the locations of the sensors. The MCT sensor 124 may be positioned between the CAC 120 and the intake valves of the cylinders 110. Thus, outputs from the MCT sensor 124 may be used to estimate a temperature of the air charge delivered to the cylinders 110. The ACT sensor 125 may be located upstream of the CAC 120 as shown, however, in alternate embodiments, the ACT sensor 125 may be positioned upstream of compressor 114. Thus, outputs from the ACT sensor 124 may be used to estimate a temperature of boosted air having been compressed by the compressor 114 before it flows through and is cooled by the CAC 120. The air temperature may be further used in conjunction with an engine coolant temperature to compute the amount of fuel that is delivered to the engine, for example.

The engine system 12 may additionally include an oxygen sensor 129 for measuring an oxygen content of intake air supplied to the cylinders 110. Specifically, the oxygen sensor 129 may be positioned in the intake manifold 121, downstream of the CAC 120. However, in other examples, it should be appreciated that the oxygen sensor 129 may be positioned elsewhere in the intake system 104, such as upstream of the CAC 120, between the CAC 120 and the compressor 114. The oxygen sensor 129 may be used to estimate a humidity of the intake air. Further, by estimating the humidity of the intake air, output from the oxygen sensor 129 may be used to feedback control an amount of fluid injected by injector 170.

Specifically, to determine a humidity of the intake air, a first pumping voltage ($V_1$) and a second pumping voltage ($V_2$) may be sequentially applied to the sensor 129. The first pumping voltage may pump oxygen from the oxygen pumping cell, but may have a low enough value so as to not dissociate water (e.g., $H_2O$) molecules in the pumping cell (e.g., $V_1$=450 mV). When the first voltage is applied to the pumping cell, a first pumping current ($I_1$) may be generated. In this example, because fuel is injected to the engine and combustion is carried out, the first pumping current may be indicative of an amount of oxygen in the intake gas.

The second pumping voltage ($V_2$) applied to the pumping cell of the sensor 129 may be greater than the first pumping voltage, and the second voltage may be high enough to dissociate oxygen compounds such as water molecules. Application of the second pumping voltage across the oxygen pumping cell may generate a second pumping current ($I_2$). The second pumping current may be indicative of an amount of oxygen and water in the sample gas (e.g., oxygen that already exists in the sample gas plus oxygen from water molecules dissociated when the second pumping voltage is applied).

Once the first and second pumping currents are generated, a humidity of the intake gas may be determined based on an amount of water in the sample. For example, the first pumping current may be subtracted from the second pumping current to determine a value that corresponds to an amount of water in the intake. As explained below with reference to FIG. 3, an amount of fluid injected by the injector 170 may be feedback controlled to a desired humidity level based on outputs from the sensor 129. Thus, the injector 170 may inject fluid into the intake system 104 until the humidity level of the intake air reaches the desired humidity level. In this way, fuel injector coking may be The intake system 104 further includes intake manifold 121 which supplies intake air to each of the cylinders 110. In some examples, a plurality of throttles (e.g., intake throttles) 132 may be positioned in a plurality of intake runners 134. Specifically, each of the intake runners 134 has a single throttle positioned therein. Furthermore, each intake runner 134 is in fluidic communication with one of the cylinders 110 and the intake manifold 121, for flowing intake air there-between. In this way, each cylinder may have an individual throttle. Each of the throttles 132 includes a throttle plate 136. The throttles 132 are configured to adjust the airflow through each of the runners 134. It will be appreciated that the throttles 132 may be synchronously controlled. That is to say that the throttles 132 may be controlled via a single shaft extending through each of the throttle plates. However, in other examples each throttle may be separately controlled. A controller 150 included in the engine 102 may be used to control operation of the throttles 132. Controller 150 may also be referred to herein as electronics unit 150.

In other examples, the engine system 12 may not include the runners 134 and throttles 132, and instead may include a single throttle positioned downstream of the compressor 114, for regulating an amount of airflow to the engine cylinders 110.

Fuel may be supplied to the one or more direct fuel injectors 166 for injecting fuel directly into the cylinders 110. Although only one of the direct fuel injectors 166 is depicted in FIG. 1, it should be appreciated that a direct fuel injector may be included in each of the cylinders 110. Thus, each of the cylinders 110 may include a direct fuel injector.

The exhaust system 106 may include a plurality of exhaust runners 142 in fluidic communication with the cylinders 110 and an exhaust manifold 144. The turbine 116 is positioned downstream of the exhaust manifold 144 in the exhaust system 106. Additionally, an emission control device 146 is positioned downstream of the turbine 116. The turbine 116 is rotatably coupled to the compressor 114. A shaft or other suitable component may be utilized to couple the turbine 116 and the compressor 114. However, in other examples the turbine 116 may be omitted from the engine and rotational energy from a transmission in the vehicle 100 may be used to provide rotational energy to the compressor 114. A pressure sensor 147 may be coupled to the exhaust manifold 144. An oxygen sensor 148 may be coupled to an exhaust conduit 149 upstream or downstream of the emission control device 146. However, in other examples, the oxygen sensor 148 may be coupled to upstream of the emission control device 146. In some examples, outputs from the oxygen sensor 148 may be used to determine one or more of a type of fuel, fuel characteristics, humidity, water content, air/fuel ratio, particulate matter content, etc., in the exhaust gas. Further, in some examples, outputs from the oxygen sensor 148 may be used to determine an efficiency of the emission control device 146.

The EGR system 108 may include at least one of a high pressure EGR loop 174 and a low pressure EGR loop 172. The high pressure EGR loop 174 may be coupled on a first end to the exhaust manifold 144 upstream of the turbine 116, and on an opposite second end to downstream of the compressor 114 in the intake system 104. A valve 182 may be included in the high pressure EGR loop 174. In an open position, the valve 182 is configured to enable gas to flow through the high pressure EGR loop 174. In a closed position, the valve 182 is configured to substantially inhibit gas from flowing through the high pressure EGR loop 174. Further, the EGR loop 174 may include a first EGR cooler 197 that cools gasses in the EGR loop 174 as they pass from the exhaust manifold 144 to the intake system 104.

The low pressure EGR loop 172 may be coupled on a first end to exhaust conduit 149 downstream of the turbine 116, and on an opposite second end to upstream of the compressor 114 in the intake system 104. A valve 190 may be included in the low pressure EGR loop 172. In an open position, the valve 190 is configured to enable gas to flow through the low pressure EGR loop 172. In a closed position, the valve 190 is configured to substantially inhibit gas from flowing through the low pressure EGR loop 172. Further, the EGR loop 172 may include a second EGR cooler 196 that cools gasses in the EGR loop 172 as they pass from the exhaust system 106 to the intake system 104.

The vehicle 100 may further include a windshield wiper system that enables cleaning of a vehicle windshield 68. Windshield 68 may be a front or rear windshield of a vehicle. The windshield wiper system includes at least one windshield wiper 70 operated by wiper motor 72. In response to an operator demand, and based on input from controller 150, wiper motor 72 may be energized causing wiper 70 to make multiple sweeping cycles known as wipes or sweeps over windshield 68. The wipes or sweeps enable wiper blade 71 to remove moisture, debris, and foreign particles from the surface of windshield 68. While operating wiper motor 72 and while wiper blade 71 is sweeping, based on request from a vehicle operator, controller 150 may intermittently inject or squirt a wiper fluid onto the windshield via wiper injector 74. Wiper fluid may be stored in a wiper fluid reservoir 76 from where it is delivered to the windshield 68. Specifically, a pump 141 may be included in the reservoir 76 for pumping wiper fluid from the reservoir 76 to the injector 74. Thus, injector 74 may be in fluidic communication with the reservoir 76, and thus may receive fluid from the reservoir 76. As elaborated herein, reservoir 76 may be further coupled to the intake conduit 188, and/or intake manifold 121, and/or one or more of the cylinders 110.

This allows the wiper fluid to be injected to provide knock control in addition to being used for windshield wiping purposes. Specifically, the wiper fluid may be injected into the intake manifold 121, specifically downstream of the throttle 192, during knock conditions, thereby enabling the windshield wiper fluid to be used as a knock control fluid. Additionally, or alternatively, windshield wiper fluid may be directed injected into an engine cylinder via direct injector, such as via one or more direct fuel injectors 166 or a dedicated direct fuel injector, to provide knock control. The wiper fluid stored in reservoir 76 may include a combination of water and alcohol, such as methanol or isopropanol. However, the wiper fluid may not contain any gasoline.

Wiper fluid reservoir 76 may be included in the fuel system 118. However, in other example, the wiper fluid reservoir 76 may not be included in the fuel system 118. The fuel system 118 may include one or more reservoirs for storing liquids such as one or more of fuel, gasoline, ethanol, alcohols, oils, cleaning solutions, water, etc. In the example shown in FIG. 1, the fuel system 118 includes a fueling first reservoir 168, a knock control second reservoir 178, a humidification third reservoir 180, and the wiper fluid reservoir 76. However, it should be appreciated that in other examples, more or less than four reservoirs may be included in the fuel system 118.

The fueling first reservoir 168 may include a fuel such as gasoline, diesel, ethanol, or a blend of fuels. In the description herein, fuel first reservoir 168 may also be referred to as fuel tank 168. Thus, fuel from first reservoir 168 may be used for combustion in the engine 102. Knock control second reservoir 178 may include a knock control fluid used to reduce engine temperatures and thus reduce and/or prevent engine knock. Humidification third reservoir 180 may include liquid water, or other combinations of water and ethanol, water and methanol, water and cleaning solution, etc., which may be used to humidify the intake air in the intake system 104.

The reservoirs 168, 178, 180, and 76 may contain a fluid such as ethanol, methanol, an ethanol/water or methanol/water solution, liquid EGR, gasoline, etc. or may contain a gas such as H2, CO, gaseous EGR, etc. The fluids may have a plurality of different qualities, including but not limited to include different alcohol contents, different water contents, different octanes, different heat of vaporizations, different fuel blends, different flammability limits, and/or combinations thereof etc.

It should be appreciated that in other examples, more or less than four reservoirs may be included in the fuel system 118, and as such, the fluids in the reservoirs may be used for fewer or additional purposes. For example, knock control second reservoir 178 may not be included in the fuel system 118, and fluid in the wiper fluid reservoir 76 may be used as a knock control fluid in addition to wiper fluid for the windshield wiper system. In another example, knock control second reservoir 178 may not be included in the fuel system 118, and fluid in the third reservoir 180 (e.g., water) may be used as a knock control fluid in addition to a humidification fluid for humidifying intake air in the intake system 104. In yet further examples, humidification third reservoir 180 may not be included in the fuel system 118, and the wiper fluid reservoir 76 may additionally be used to humidify the intake air. Thus, the number of uses for the fluids in one or more of the reservoirs 76, 168, 178, and 180, may depend on the compositions of the fluids and/or the number of reservoirs included in the fuel system 118. For example, fluid containing gasoline may not be used for humidifying the intake air and/or may not be supplied to the injector 74 of the windshield wiper system.

One or more of the reservoirs 76, 168, 178, and 180 may be fluidly coupled to one or more of the direct injectors 166. Specifically, the first reservoir 168 containing liquid fuel may be fluidly coupled to the direct injectors 166 for supplying fuel thereto. Fuel injectors 166 are shown coupled to fuel rail 122. Fuel rail 122 may be coupled to fuel line 126. Fuel line 126 may be coupled to first reservoir 168. Fuel pump 251 may be coupled to first reservoir 168 and fuel line 126. Fuel rail 122 may include a plurality of sensors, including a temperature sensor and a pressure sensor. Fuel rail 122 may be configured to store a volume of fuel at a higher pressure than the first reservoir 168. Fuel pump 251 may pump fuel from the first reservoir 168 to the fuel line 126 and fuel rail 122. Fuel from the fuel rail 122 may then be supplied to the one or more fuel injectors 166 for direct injection into the cylinders 110.

However, in other examples, the first reservoir 168 may additionally or alternatively be fluidly coupled to a port injector 170 for supplying fuel thereto. Port injector 170 may inject fuel into the intake system 104 to mix with intake air before reaching the cylinders 110 in what is commonly referred to as "port injection." Reservoir 168 may include a fuel pump 151 for pumping fuel from the reservoir 168 to one or more of the injectors 166 and 170.

Similarly, second reservoir 178 may include a second pump 161 for pumping fluids from the second reservoir to one or more of the fuel injectors 166 and 170, and third reservoir 180 may include a third pump 171 for pumping fluids from the third reservoir 180 to one or more of the injectors 166 and 170.

It should be appreciated that in other examples, more or fewer injectors may be included in the engine system 12. Specifically, one or more of the reservoirs 168, 178, 180, and 76 may be coupled to their own dedicated injector in one or more of the intake conduit 188, intake manifold 121, cylinders 110, etc. For example, the injectors 166 may be configured to inject only fuel from reservoir 168, and separate direct injectors may be included in the cylinders 110 for injecting one or more of knock suppression fluid, humidifying fluid, and wiper fluid from one or more of the second reservoir 178, third reservoir 180, and wiper fluid reservoir 76, respectively. Similarly injector 170 may be configured to inject only fuel from reservoir 168, and separate port injectors may be included in the intake system 104 for injecting one or more of knock suppression fluid, humidifying fluid, and wiper fluid from one or more of the second reservoir 178, third reservoir 180, and wiper fluid reservoir 76, respectively.

Liquid may be supplied to the third reservoir 180 from a condensation unit 195. Thus, the third reservoir 180 may be fluidly coupled to the condensation unit 195. The condensation unit 195 may be any suitable condenser or coolant unit that converts a gaseous substance such as water vapor its liquid state, by cooling it. For example, the condensation unit 195 may be one or more of an EGR cooler such as EGR coolers 196 and 197 described above, a condenser of an air conditioning system of the vehicle 100, a radiator, etc. In some examples, more than one condensation unit may be used to supply liquid to the third reservoir 180. For example, the condensation unit 195 may receive liquid from one or more EGR coolers, and/or a radiator, and/or a condenser of the vehicle air conditioning system. In some examples, a pump may be included to pump liquid from the condensation unit 195 to the third reservoir. The pump may be positioned between the condensation unit 195 and the liquid reservoir 180. The condensation unit 195 may separate liquid from the fluid flowing through the condensation unit 195 and may deliver the liquid to the reservoir 180. Alternatively, the water separated off at the condensation unit 195 may be conducted into the reservoir 180 under the action of gravitational force. In this way, condensation formed in the vehicle 100 may be used to humidify air supplied to one or more engine cylinders.

Further, in some examples, the third reservoir 180 may be fluidly coupled to the wiper fluid reservoir 76, and may receive liquid from the wiper fluid reservoir 76. As such, the third reservoir 180 may receive liquid from the condensation unit 195 and/or wiper fluid reservoir 76. Liquid from the third reservoir 180 may then be directed to the injector 170 for injection into the intake system 104. Additionally or alternatively, the liquid from the third reservoir 180 may be routed to one or more injectors included in the cylinders 110, such as injectors 166, for direct injection into the engine cylinders 110. Injector 170 may in some examples comprise an atomizer.

En route to the injector 170, liquid from the third reservoir 180 may be converted from a liquid phase to a gaseous phase by an evaporation unit 138. Evaporation unit 138 may also be referred to herein as humidification unit 138. Specifically, evaporation unit 138 may be included in a fluid line 140 between the third reservoir 180 and the injector 170, where the fluid line 140 fluidly couples the injector 170 to the fuel system 118. However, it should be appreciated that in other examples, the evaporation unit 138 may be included in the intake system 104, downstream of the air cleaner 111. More specifically, the evaporation unit 138 may be included within the intake conduit 188. Specifically, the fluid line 140 may fluidly couple the third reservoir 180 and the injector 170. The evaporation unit 138, may include a heating element 135 that heats the liquid provided to the evaporation unit 138 to above the phase change temperature of the liquid, causing the liquid to change from liquid to gas. Specifically, the heating element 135 may be in electrical communication with the controller 150 and may be powered on prior to humidifying the intake air via injection from injector 170 to evaporate the liquid supplied from reservoir 180 to the injector 170. The timing of the operation of the heating element 135, duration it is powered on, and amount of power supplied thereto may be controlled by the controller 150 to regulate an amount of heating of the fluid supplied to the evaporation unit 138.

However in other examples, where liquid is injected from injector 170, such as when the intake air is sufficiently hot to evaporate the injected liquid, the liquid may bypass the evaporation unit 138 via a bypass line 137. Thus, in some examples, liquid may be routed to the injector 170 without passing through the evaporation unit 138, via the bypass line 137. In another example, when injecting fuel from reservoir 168 into the intake system 104 via the injector 170, the fuel from the reservoir 168 may be diverted through the bypass line 137, and may not flow through the evaporation unit 138. However, in other examples, when it is desired to inject a liquid from the injector 170, the heating element 135 may be powered off, such that the fluid is not heated when passing through the evaporation unit 138. Thus, the evaporation unit 138 may be operated in a first mode where the heating element 135 is powered on, and fluid supplied to the evaporation unit 138 is evaporated, and in a second mode where the heating element 135 is powered off, and fluid supplied to the evaporation unit 138 is not heated. Thus, in some examples, the bypass line 137 may not be included, and the heating element 135 may be switched off when delivering liquid to the injector 170.

When included, the bypass line 137 may be fluidly coupled on a first end to the line 140 upstream of the evaporation unit 138, and on an opposite second end to downstream of the evaporation unit 138, for routing liquid around the evaporation unit 138 en route to the injector 170. A valve 139 may be positioned in the line 140 where the first end of the bypass line is coupled. The valve 139 may be a three-way valve, and may be adjusted to regulate an amount of liquid flowing to the evaporation unit 138 or around the evaporation unit 138 via the bypass line 137. For example, the valve 139 may be adjusted to a first position where substantially no fluid flows through the bypass line 137, and substantially all of the fluid in line 140 flows through the evaporation unit 138. The valve 139 may be adjusted to a second position where substantially no fluid flows through the evaporation unit, and substantially all of the fluid in line 140 flows through the bypass line 137. Further, the valve 139 may be adjusted to any position between the first and second position to adjust a relative amount of fluid flowing through the evaporation unit 138 and the bypass line 137, where an amount of fluid flowing through the bypass line 137 relative to the evaporation unit 138 may increase with increasing deflection of the valve 139 away from the first position towards the second position.

Injector 170 may be positioned in the intake system 104 downstream of the throttle 192. In some examples, as depicted in the example of FIG. 1, the injector 170 may be positioned between the compressor 114 and the CAC 120. However, in other examples, the injector 170 may be positioned downstream of the CAC 120 in the intake manifold 121.

In this way, liquid water or gaseous water vapor may be injected into the intake system 104 via injector 170 to humidify the intake air supplied to the cylinders 110. In other examples, the liquid water or gaseous water vapor may be directly injected into the engine cylinders 110. By humidifying the intake air, coking deposits on the one or more direct fuel injectors 166 may be reduced and/or removed. Further, injection of liquid water and/or gaseous water vapor may reduce the temperature of the intake air which may reduce and/or prevent engine knock.

Controller 150 is shown in FIG. 1 as a conventional microcomputer including: microprocessor unit 152, input/output ports 154, read-only memory 156, random access memory 158, keep alive memory 160, and a conventional data bus. Controller 150 is shown receiving various signals from sensors 162 coupled to engine 102, such as a pressure sensor 127, pressure sensor 123, and oxygen sensor 148. The controller 150 may be configured to send signals to actuators 164 such as throttles 132, valve 182, valve 190, and throttle 192. Additionally, instructions for carrying out various routines, such as the routines shown in FIGS. 3-5 (described further below), may be stored in the memory of the controller 150.

For example, the controller may determine when it is desired to humidify the intake air based on engine operating conditions. For example, the controller may determine that it is desired to humidify the intake air when coking of one or more of the fuel injectors 166 is detected. Coking may be detected when one or more of a difference between a commanded fuel injection amount and a measured fuel injection amount increases by more than a threshold difference, the engine load has remained below a threshold load for more than a duration, the humidity of intake has remained below a threshold humidity for more than a duration, etc. When it is desired to humidify the intake air, the controller 150 may send signals to the pump of the reservoir 180 to pump liquid (e.g., water) from the reservoir to one or more of the direct injectors 166 and/or port injector 170. The controller may determine whether it is desired to evaporate the liquid from the reservoir 180 en route to the injectors 166 and/or 170 based on intake air temperature and/or engine temperature. It may not be desired to evaporate the liquid with the evaporation unit 138 when the intake air temperature is greater than a threshold. For example, when the intake air is greater than the threshold temperature, the intake air may be sufficiently hot to vaporize liquid injected by the injector 170. When the intake air temperature is greater than the threshold then, the liquid from the reservoir 180 may not be evaporated en route to injector 170. Thus, when the intake air is sufficiently hot to evaporate the liquid injected from injector 170, the liquid may not be evaporated prior to injection by the injector 170. Similarly, when the engine cylinder temperatures are greater than a threshold it may not be desired to evaporate the liquid supplied to injectors 166 from reservoir 180 en route from the reservoir 180 to the injectors 166. When the engine cylinder temperatures are greater than the threshold then, the liquid from the reservoir 180 may not be evaporated en route to injectors 166. Thus, when the intake air is sufficiently hot to evaporate the liquid injected from injector 170, the liquid may not be evaporated prior to injection by the injector 170.

However, when it is desired to evaporate the liquid supplied from the reservoir 180 en route to one or more of the fuel injectors 166 and 170, the controller 150 may power on the heating element 135 of the evaporation unit 138, to evaporate the liquid before it reaches one or more of the injectors 166 and 170. For example, it may be desired to evaporate liquid supplied to the injector 170 from the reservoir 180 when the intake air upstream of the CAC 120 is less than the threshold. Similarly it may be desired to evaporate liquid supplied to the injectors 166 from the reservoir 180 when the air in the cylinders 110 is less than the threshold. Thus, when the intake air is not sufficiently hot to evaporate the liquid injected from injector 170, the liquid may be evaporated prior to injection by the injector 170.

To evaporate the liquid supplied from the reservoir 180 to one or more of the injectors 166 and 170, the liquid may be directed through the evaporation unit 138. The controller 150 may power on the heating element 135 of the evaporation unit 138 upon determining that it is desired to evaporate the liquid supplied from the reservoir 180 en route to one or more of the injectors 166 and 170. Further the controller 150 may send signals to one or more of the injectors 166 and 170 to regulate an amount of humidifying fluid injected by the one or more injectors 166 and/or 170. The controller 150 may command a desired amount of humidifying fluid to be injected, where the controller 150 may determine the desired amount of humidifying fluid based on engine operating conditions such as one or more of intake humidity, intake air temperature, engine temperature, fuel injection amount, coking levels, etc.

Turning now to FIG. 2, it shows a detailed embodiment of one of the combustion chambers 110 of engine 102 described above with reference to FIG. 1. Components previously introduced in FIG. 1 are numbered similarly and may not be reintroduced in the description of FIG. 2 herein.

Engine 102 may receive control parameters from a control system including controller 150 and input from a vehicle operator 230 via an input device 232. In this example, input device 232 includes an accelerator pedal and a pedal position sensor 234 for generating a proportional pedal position signal PP. Each of the cylinders 110 of engine 102 may include combustion chamber walls 236 with piston 238 positioned therein. Piston 238 may be coupled to crankshaft 240 so that reciprocating motion of the piston 238 is translated into rotational motion of the crankshaft 240. Crankshaft 240 may be coupled to at least one drive wheel of the passenger vehicle via a transmission system. Further, a starter motor may be coupled to crankshaft 240 via a flywheel to enable a starting operation of engine 102.

Each of the cylinders 110 may receive intake air via a series of intake air passages 188, 121, and 134. Intake conduit 188 may communicate with other cylinders of engine 102 in addition to the cylinder shown in FIG. 2. In some embodiments, one or more of the intake passages may include a boosting device such as a turbocharger or a supercharger. For example, FIG. 2 shows engine 102 configured with a turbocharger including the compressor 114 arranged in intake conduit 188, and an exhaust turbine 116 arranged along exhaust passage 248. Compressor 114 may be at least partially powered by exhaust turbine 116 via a shaft 280 where the boosting device is configured as a turbocharger. However, in other examples, such as where engine 102 is provided with a supercharger, exhaust turbine 116 may be optionally omitted, where compressor 114 may be powered by mechanical input from a motor or the engine. Throttle 132 including throttle plate 136 may be provided downstream of the compressor 114 for varying the flow rate and/or pressure of intake air provided to the engine cylinders.

Exhaust passage 248 may receive exhaust gases from other cylinders of engine 102 in addition to the cylinder shown in FIG. 2. Exhaust gas sensor 228 is shown coupled to exhaust passage 248 upstream of emission control device 146. Sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 146 may be a three way catalyst (TWC), NOx trap, various other emission control devices, or combinations thereof.

Exhaust temperature may be measured by one or more temperature sensors (not shown) located in exhaust passage 248. Alternatively, exhaust temperature may be inferred based on engine operating conditions such as speed, load, air-fuel ratio (AFR), spark retard, etc. Further, exhaust temperature may be computed by one or more exhaust gas sensors 228. It may be appreciated that the exhaust gas temperature may alternatively be estimated by any combination of temperature estimation methods listed herein.

Each cylinder of engine 102 may include one or more intake valves and one or more exhaust valves. For example, cylinders 110 are shown including at least one intake poppet valve 250 and at least one exhaust poppet valve 256 located at an upper region of each of the cylinders 110. In some embodiments, each cylinder of engine 102, may include at least two intake poppet valves and at least two exhaust poppet valves located at an upper region of each of the cylinders 110.

Intake valve 250 may be controlled by controller 150 by cam actuation via cam actuation system 251. Similarly, exhaust valve 256 may be controlled by controller 150 via cam actuation system 253. Cam actuation systems 251 and 253 may each include one or more cams and may utilize one or more of cam profile switching (CPS), variable cam timing (VCT), variable valve timing (VVT) and/or variable valve lift (VVL) systems that may be operated by controller 150 to vary valve operation. The operation of intake valve 250 and exhaust valve 256 may be determined by valve position sensors (not shown) and/or camshaft position sensors 255 and 257, respectively. In alternative embodiments, the intake and/or exhaust valve may be controlled by electric valve actuation. For example, each of the cylinders 110 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Each of the cylinders 110 has a compression ratio, which is the ratio of volumes when piston 238 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 102 may include a spark plug 112 for initiating combustion. Ignition system 290 can provide an ignition spark to each of the engine cylinders 110 via spark plug 112 in response to spark advance signal SA from controller 150, under select operating modes. However, in some embodiments, spark plug 112 may be omitted, such as where engine 102 may initiate combustion by auto-ignition or by injection of fuel as may be the case with some diesel engines.

In some embodiments, each cylinder of engine 102 may be configured with one or more injectors for providing a knock control fluid thereto. In some embodiments, the knock control fluid may be a fuel, wherein the injector is also referred to as a fuel injector. As a non-limiting example, the cylinder depicted in FIG. 2 is shown including one of the fuel injectors 166. Fuel injectors 166 are directly coupled to the cylinders 110 for injecting fuel directly therein in proportion to the pulse width of signal FPW received from controller 150 via electronic driver 268. In this manner, fuel injectors 166 provide what is known as direct injection (hereafter also referred to as "DI") of fuel into combustion chambers 110. While FIG. 2 shows injector 166 as a side injector, it may also be located overhead of the piston, such as near the position of spark plug 112. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injectors 166 from fuel system 118, specifically from fuel tank 168, fuel pumps, and a fuel rail. Although only one fuel tank is shown in FIG. 2, it should be appreciated that multiple fuel tanks may be included in the fuel system 118. Alternatively, fuel may be delivered by a single stage fuel pump at lower pressure, in which case the timing of the direct fuel injection may be more limited during the compression stroke than if a high pressure fuel system is used. Further, while not shown, fuel tank 168 may have a pressure transducer providing a signal to controller 150. It will be appreciated that, in an alternate embodiment, one or more of the injectors 166 may be port injectors providing fuel into the intake port upstream of the cylinders 110.

Fuel may be delivered by the injectors 166 to the cylinders 110 during a single cycle of the cylinders. Further, the distribution and/or relative amount of fuel delivered from the injectors may vary with operating conditions, such as aircharge temperature, as described herein below. Furthermore, for a single combustion event, multiple injections of the delivered fuel may be performed per cycle. The multiple injections may be performed during the compression stroke, intake stroke, or any appropriate combination thereof.

A fuel flow meter 242 may be included between the fuel tank 168 and the injectors 166 for measuring an amount of fuel injected by the injectors 166. In some examples, the flow meter 242 may be configured to measure a volume flow rate of fuel to the injectors 166. However, in other examples, the flow meter 242 may be configured to measure a mass flow rate of fuel to the injectors 166. In yet further examples, the flow meter 242 may be a pressure sensor, and the flow rate may be estimated based on a pump speed of a fuel pump included in the fuel tank 168, and a pressure sensed at the flow meter 242.

As described above, FIG. 2 shows only one cylinder of a multi-cylinder engine. As such each cylinder may similarly include its own set of intake/exhaust valves, fuel injector(s), spark plug, etc.

One or more of the fuel tanks may hold fuel or knock control fluids with different qualities, such as different compositions. These differences may include different alcohol content, different water content, different octane, different heat of vaporizations, different fuel blends, different water contents, different flammability limits, and/or combinations thereof etc. In one example, knock control fluids with different alcohol contents could include one fuel being gasoline and the other being ethanol or methanol. Other alcohol containing fuels could be a mixture of alcohol and water, a mixture of alcohol, water, etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

In addition to the fuel tanks, fuel system 118 may also include the reservoir 76 for storing a windshield wiper fluid. However, in some examples, the reservoir 76 may additionally or alternatively store a knock control fluid. While reservoir 76 is depicted as being distinct from the fuel tank 168, it will be appreciated that in alternate examples, reservoir 76 may be included within the fuel tank 168. Reservoir 76 may be coupled to direct injectors 166 such that wiper fluid can be directly injected into the cylinders 110. During some conditions, in response to an indication of knock, an engine controller may inject wiper fluid and/or knock control fluid contained within the reservoir 76, into the intake manifold, downstream of the intake throttle 192, to increase engine dilution and thereby control the untimely and unwanted detonation event. Alternatively, or additionally, in response to an indication of knock, the engine controller may directly inject wiper fluid and/or knock control fluid, into the engine cylinders 110 to increase engine dilution and thereby control the untimely and unwanted detonation event.

In some embodiments, the fuel system 118 may also include third reservoir 180 for storing water and/or other liquids. Third reservoir 180 may be coupled to reservoir 76 for receiving fluid therefrom. As explained above, the third reservoir 180 may additionally receive liquids from various vehicle components that have collected condensation, such as one or more of one or more EGR coolers, radiator, air conditioning condenser, charge air cooler, etc. Third reservoir 180 may be coupled to port injector 170 and/or direct injectors 166 for injecting liquid water and/or water vapor into intake air.

Exhaust gasses may be routed through EGR loop 172 from downstream of turbine 116 to upstream of compressor 114. The amount of LP-EGR provided to intake manifold 121 may be varied by controller 150 via LP-EGR valve 190. Under some conditions, the EGR system may be used to regulate the temperature of the air and fuel mixture within combustion chambers 110. Thus, it may be desirable to measure or estimate the EGR mass flow. For example, one or more sensors 259 may be positioned within EGR loop 172 to provide an indication of one or more of a pressure, temperature, and air-fuel ratio of exhaust gas recirculated through the EGR loop 172. Exhaust gas diverted through EGR loop 172 may be diluted with fresh intake air at a mixing point located at the junction of EGR loop 172 and intake conduit 188. In some examples, where an air intake system (AIS) throttle is included in intake conduit 188, upstream of compressor 114, by adjusting valve 190 in coordination with the air intake system throttle, a dilution of the EGR flow may be adjusted.

A percent dilution of the LP-EGR flow may be inferred from the output of a sensor in the engine intake gas stream. For example, a sensor 129 positioned downstream of valve 190, and upstream of main intake throttle 192, may be used so that the LP-EGR dilution at or close to the main intake throttle may be accurately determined. Sensor 129 may be, for example, an oxygen sensor. In addition, during selected conditions, sensor 129 may be used for estimating a humidity content of the intake air, an alcohol content of fuel delivered to the engine, etc.

Controller 150 is shown in FIG. 2 as a microcomputer, including microprocessor unit 152, input/output ports 154, an electronic storage medium for executable programs and calibration values shown as read only memory chip 156 in this particular example, random access memory 158, keep alive memory 160, and a data bus. Controller 150 may receive various signals from sensors coupled to engine 102, in addition to those signals previously discussed, including measurement of inducted mass air flow (MAF) from mass air flow sensor 222; engine coolant temperature (ECT) from temperature sensor 216 coupled to cooling sleeve 218; a profile ignition pickup signal (PIP) from Hall effect sensor 220 (or other type) coupled to crankshaft 240; throttle position (TP) from a throttle position sensor; and manifold absolute pressure signal (MAP) from sensor 224. Engine speed signal, RPM, may be generated by controller 150 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system. Controller 150 may also receive an operator request for windshield wiping via a dedicated sensor (not shown). In response to the signals received from the various sensors, the controller may operate various engine actuators. Example actuators include fuel injectors 166, wiper motor 72, wiper injector 74, throttle 192, cams 251 and 253, etc. Storage medium read-only memory 156 can be programmed with computer readable data representing instructions executable by processor 152 for performing the methods described below as well as other variants that are anticipated but not specifically listed. Example routines that may be performed are elaborated with reference to FIGS. 3-5.

In this way, it is even possible for two or more, in particular all, of the injection nozzles of the Otto-cycle engine to be correspondingly freed from deposits. The Otto-cycle engine may be a direct-injection Otto-cycle engine. With respect to a flow direction of the intake air flowing in the direction of the Otto-cycle engine, the humidification unit may preferably arranged on the intake unit downstream of an air filter arranged on the intake unit. The system may also have two or more corresponding humidification units.

In one advantageous refinement, the humidification unit has at least one evaporator or atomizer by means of which the water can be evaporated or atomized in the intake unit. With the evaporator, it may be possible for water vapor, with which the intake air can be humidified, to be generated within the intake unit. For this purpose, the evaporator may have a heating device by means of which the water can be heated in order to evaporate the water. With the atomizer, for example in the form of at least one nozzle, it may be possible for water to be atomized in the intake unit such that extremely small water droplets form, with which the intake air can be humidified. The humidification unit may also have two or more evaporators or atomizers or a combination of at least one evaporator with at least one atomizer.

In a further advantageous refinement, the system comprises at least one liquid reservoir which is or can be arranged on the motor vehicle and which is or can be connected in fluid-conducting fashion to the humidification unit. The humidification unit can be supplied with water by way of the liquid reservoir, for which purpose the humidification unit is or can be connected in fluid-conducting fashion to the liquid reservoir. The humidification unit may be connected or connectable in fluid-conducting fashion to the liquid reservoir by way of at least one fluid line. Furthermore, the humidification unit may be connected in fluid-conducting fashion to the liquid reservoir in uninterrupted fashion or at certain points in time. Between the humidification unit and the liquid reservoir there may be connected a pump by means of which water can be delivered from the liquid reservoir to the humidification unit when required, in particular upon the activation thereof. Alternatively, the water may be conducted from the liquid reservoir to the humidification unit under the action of gravitational force. The system may also have two or more corresponding liquid reservoirs.

One advantageous refinement provides that the system has at least one condensation unit which is or can be arranged on the motor vehicle and which serves for generating condensation water and which is or can be connected in fluid-conducting fashion to the liquid reservoir. Water can be supplied to the liquid reservoir by way of the condensation unit. The condensation unit may be a condensation component of an air-conditioning system of the motor vehicle. Alternatively, the condensation unit may be a condensation component of an external exhaust-gas recirculation arrangement, in particular low-pressure exhaust-gas recirculation arrangement. The condensation unit may be connected or connectable in fluid-conducting fashion to the liquid reservoir by way of a fluid line. Furthermore, the condensation unit may be connected in fluid-conducting fashion to the liquid reservoir in uninterrupted fashion or at certain points in time. Between the condensation unit and the liquid reservoir there may be connected a pump by means of which water separated off at the condensation unit can be delivered to the liquid reservoir as required. Alternatively, the water separated off at the condensation unit can be conducted into the liquid reservoir under the action of gravitational force. The system may also have two or more corresponding condensation units, in particular a combination of condensation units formed by different functional devices of the motor vehicle, for example the air-conditioning system and the external exhaust-gas recirculation arrangement.

The liquid reservoir is advantageously connected or connectable in fluid-conducting fashion to a windshield washer system of the motor vehicle. Water can be supplied to the liquid reservoir by way of the windshield washer system. The liquid reservoir may be connected or connectable in fluid-conducting fashion to the windshield washer system, in particular to the liquid container thereof, by way of a fluid line. Furthermore, the liquid reservoir may be connected in fluid-conducting fashion to the windshield washer system in uninterrupted fashion or at certain points in time. Between the liquid reservoir and the windshield washer system there may be connected a pump by means of which water, with or without cleaning agent additives, can be delivered to the liquid reservoir as required. Alternatively, the water of the windshield washer system can be conducted into the liquid reservoir under the action of gravitational force.

It is furthermore advantageous for the system to have at least one electronics unit which is connected or connectable in terms of signal transmission to the humidification unit and by means of which the humidification unit can be temporarily activated. The electronics unit may be formed separately or integrated into an existing vehicle electronics arrangement. The electronics unit may be connected in terms of signal transmission to the humidification unit by means of wires or wirelessly. The electronics unit may be designed to activate a heating device of an evaporator of the humidification device in order to generate thermal energy, under the action of which the water can be evaporated.

The motor vehicle according to at least one representation of the present disclosure comprises at least one Otto-cycle engine which has at least one injection nozzle by means of which a fuel can be injected directly into a combustion chamber of the Otto-cycle engine, at least one intake unit which serves exclusively for conducting intake air and by means of which intake air can be supplied to the Otto-cycle engine, and at least one system as per one of the abovementioned refinements or any desired combination thereof. The motor vehicle is correspondingly associated with the advantages mentioned above with regard to the system. The Otto-cycle engine is a direct-injection Otto-cycle engine.

Figure 4:
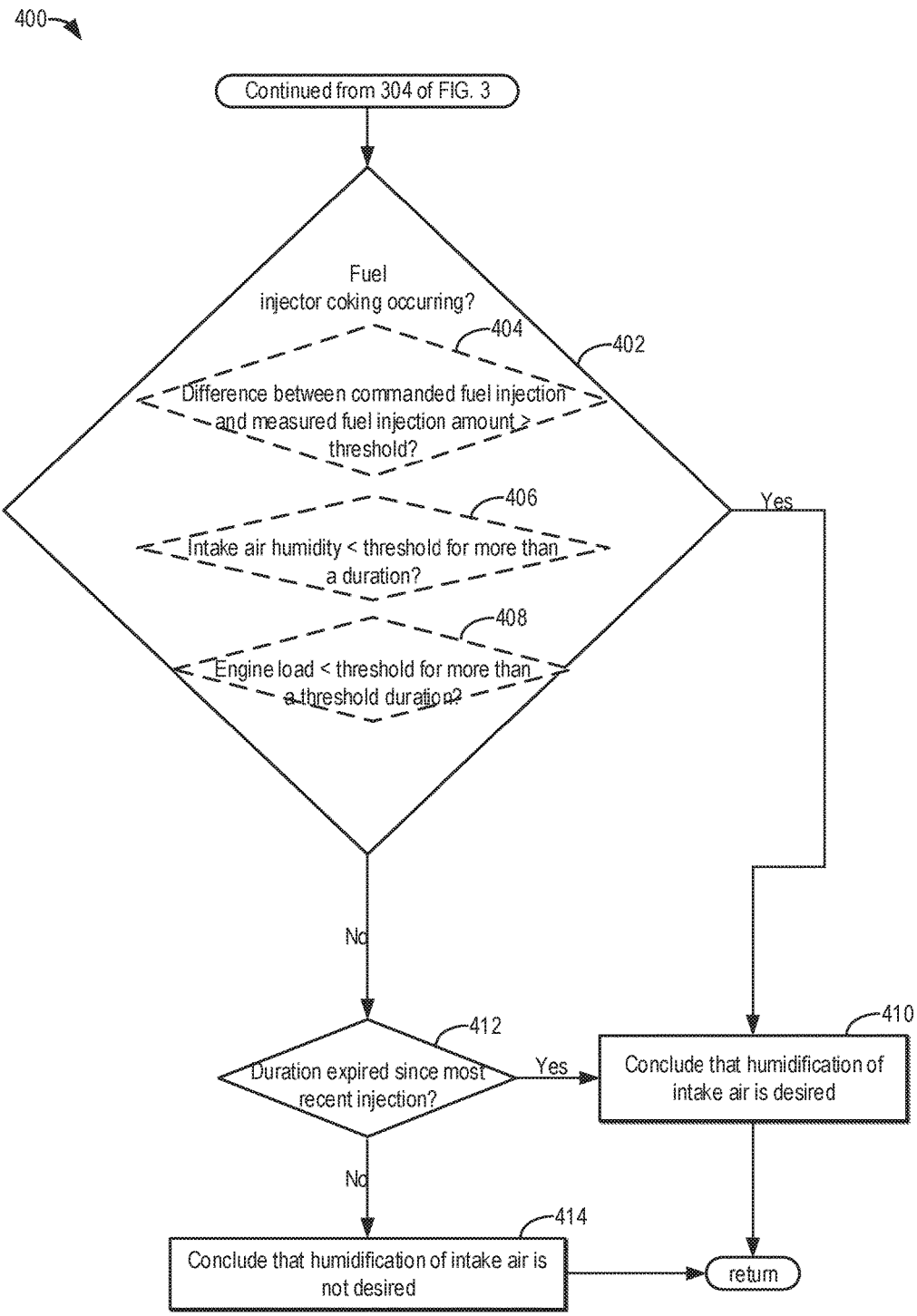
FIG. 4 shows a flow chart of an example method for determining when to remove coking deposits in a fuel system, in accordance with one or more embodiments of the present disclosure.
Figure 5:
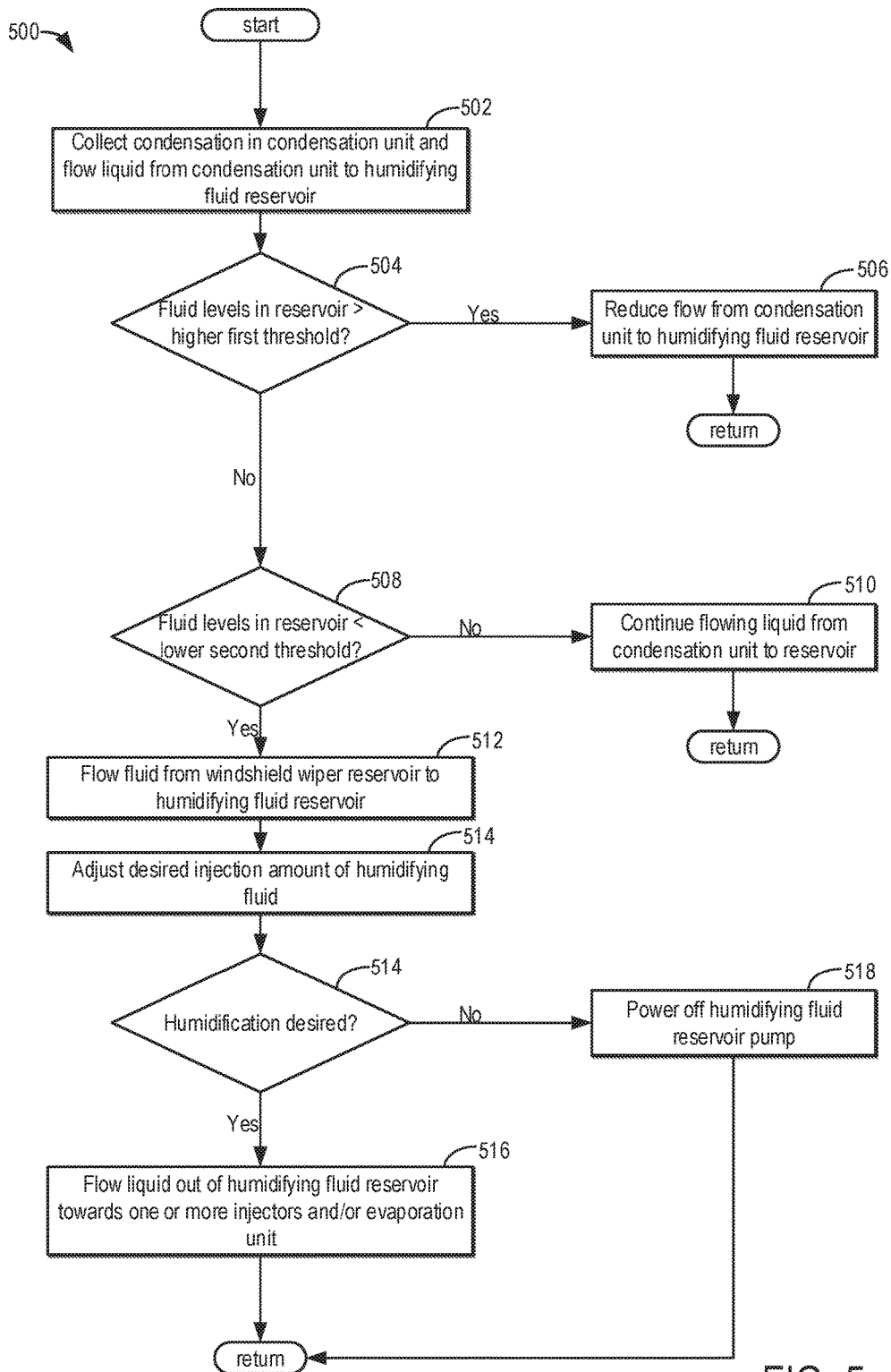
FIG. 5 shows a flow chart of an example method for regulating flow of a humidifying fluid used for removing coking deposits from a fuel system, in accordance with one or more embodiments of the present disclosure.

Turning now to FIGS. 3-5, they show example methods for reducing and/or removing coking deposits on one or more fuel injectors (e.g., injectors 166 described above in FIGS. 1-2) by humidifying intake air supplied to one or more engine cylinders (e.g., engine cylinders 110 described above in FIGS. 1-2) including the fuel injectors. The methods described below in FIGS. 3-5 may be stored in nontransitory memory of an engine controller (e.g., controller 150 described above in FIGS. 1-2) and may be executed by the controller based on outputs from various engine and/or vehicle sensors such as an intake oxygen sensor (e.g., oxygen sensor 129 described above in FIGS. 1-2).

Focusing on FIG. 3, its shows a first example method 300 for humidifying the intake air of an engine system (e.g., engine system 12 described above in FIGS. 1-2). Method 300 begins at 302 which comprises estimating and/or measuring engine operating conditions. Engine operating conditions may include one or more of engine temperature, air/fuel ratio, fuel injection amount, injection timing, spark timing, intake air temperature, engine load, engine speed, driver requested torque, engine temperature, intake air humidity, boost pressure, etc. The engine operating conditions may be estimated by the controller based on outputs from various engine sensors. For example, the controller may estimate humidity levels based on the intake oxygen sensor in a similar manner to that described above with reference to FIG. 1. For example, the oxygen sensor may be a variable voltage oxygen sensor that operates at two voltages, a first voltage that does not dissociate water molecules, and a second higher voltage that does dissociate water molecules. By comparing the resulting pumping current from the two applied voltages, an estimate of the humidity content of the intake air may be obtained. As another example, an amount of fuel injected by the fuel injectors may be estimated based on outputs from a fuel flow meter (e.g., flow meter 242 described above in FIG. 2) positioned between a fuel tank (e.g., fuel tank 168 described above in FIGS. 1-2) and the injectors.

After estimating and/or measuring engine operating conditions at 302, method 300 may continue from 302 to 304 which may comprise determining if it is desired to humidify the intake air. An example method for determining whether or not it is desired to humidity the intake air is described below with reference to FIG. 4. Thus, the method 400 described below in FIG. 4 may be executed as a subroutine of method 300 at 304. The controller may determine that it is desired to humidify the intake air when coking of the fuel injectors is detected and/or more than a threshold duration has expired since a most recent intake air humidification event. The humidification event may be an instance where the humidifying fluid is injected into the intake air. In another examples, a humidification event may be when the ambient humidity increases above a threshold and/or, the ambient humidity is approximately the same or greater than the desired humidity level. Thus, in some examples, the intake air may be humidified at regular time intervals and/or based on engine operating conditions to reduce and/or prevent coking of the fuel injectors. Coking of the fuel injectors may be detected when one or more of the actual fuel amount injected by the fuel injectors differs from the desired amount by more than a threshold difference, the intake air humidity level has remained below a threshold for more than a duration, and the engine load has remained below a threshold for more than a duration.

If it is not desired to humidify the intake air at 304, then method 300 may continue from 304 to 306 which comprises continuing to adjust knock control fluid and/or fuel injection based on engine operating conditions. For example, the controller may continue to inject fuel to the engine cylinders to meet engine load demands and maintain a desired air/fuel ratio (e.g., stoichiometry). Further, the controller may periodically inject a knock control fluid in response to engine operating conditions reaching levels where knock could occur, such as when engine temperatures increase above a threshold, intake air temperature increases above a threshold, etc. Method 300 then returns.

However, if at 304 it is determined that it is desired to humidify the intake air, then method 300 may continue from 304 to 308 which comprises determining a desired amount of humidifying fluid to be injected based on a desired humidity level. The desired humidity level may be determined by the controller based on one or more of an amount of fuel injector coking, time since a most recent humidifying fluid injection, intake air temperature, spark timing, boost pressure, EGR flow rate, etc. For example, the desired humidity level may increase for increases in the amount of fuel injector coking, where the amount of coking may increase for increases in the difference between the commanded fuel injection amount and the actual fuel injection amount, time since a most recent humidifying fluid injection, increasing durations where the humidity level has remained below a threshold, increasing durations where the engine load has remained below a threshold, etc. The controller may then determine a desired amount of humidifying fluid to be injected based on the desired humidity level. Specifically, the controller may determine the desired amount of humidifying fluid to be injected based on a difference between the current humidity level and the desired humidity level. In this way, the controller may feedback control an amount of humidifying fluid injected into the intake air based on a difference between the measured humidity level, as estimated based on outputs from the intake oxygen sensor, and the desired humidity level.

Method 300 may then continue from 308 to 310 which comprises determining if a knock control fluid injection is desired. At 310, method 300 may include determining if engine knock is currently detected, or if operating conditions anticipate engine knock occurring unless one or more engine parameters are altered. For example, engine knock may be detected by a knock sensor. In some examples, engine knock may be anticipated as a function of cylinder pressure, cylinder temperature, engine operating conditions, fuel quality, etc. If knock is detected and/or anticipated, then it may be desired to inject a knock control fluid. If it is desired to inject a knock control fluid, then method 300 may continue from 310 to 312 which comprises injecting a desired amount of knock control fluid. For example, knock control fluid may be supplied to injectors from a knock control fluid reservoir (e.g., reservoir 178 described above in FIG. 1). The knock control fluid may be pumped to the injectors by a pump (e.g., pump 161 described above in FIG. 1), and/or may be flowed to the injectors via gravity. In some examples, the knock control fluid may be injected by the fuel injectors. However, in other examples, the knock control fluid may be injected by separated, dedicated injectors positioned in the cylinders. Thus, the knock control fluid may in some examples be directly injected into the cylinders. However, in other examples, the knock control fluid may be injected into the engine intake (e.g., intake system 104 described above in FIG. 1) by a port injector (e.g., injector 170 described above in FIGS. 1-2). However, in other examples, the knock control fluid may be the same or similar to a windshield wiper fluid, and as such may be stored in a wiper fluid reservoir (E.g., reservoir 76 described above in FIGS. 1-2). In other examples, the knock control fluid may be the same or similar to a humidifying fluid stored in a humidifying fluid reservoir (e.g., reservoir 180 described above in FIGS. 1-2).

Method 300 may then continue from 312 to 314 which comprises adjusting the desired amount of humidifying fluid to be injected based on the amount of knock control fluid injected at 312. For example, the knock control fluid may contain water, and as such may humidify the gas mixture in the cylinders. Based on the amount of knock control fluid injected at 312, and/or a composition of the knock control fluid (e.g., water content of the knock control fluid), the controller may determine the resulting water content (e.g., humidity of the resulting mixture) in the engine cylinders. For example, the humidity of the mixture in the cylinders may increase for increases in the amount of knock control fluid injected at 312, and/or for increases in the water concentration of the knock control fluid injected at 312. Thus, the desired amount of humidifying fluid to be injected may decrease for increases in the amount of knock control fluid injected at 312 and/or for increases in the water concentration of the knock control fluid.

After adjusting the desired amount of humidifying fluid to be injected based on the knock control fluid injection, method 300 may continue from 314 to 316 which comprises determining if injecting the humidifying fluid will result in the knock control fluid levels decreasing below a threshold. Alternatively, method 300 may proceed from 310 to 316 if it is determined at 310 that knock control fluid injection is not desired. In examples, where the knock control fluid is used to as the humidifying fluid to the humidification injection, proceeding with the injecting the humidifying fluid may cause the knock control fluid levels to decrease. If the humidification injection will cause the knock control fluid levels to decrease below the threshold, then method 300 may continue from 316 to 318 which comprises waiting to inject the humidifying fluid until the knock control fluid levels increase. Specifically, the method at 318 may comprise delaying the humidification injection until knock control fluid levels reach levels where the knock control fluid levels would not decrease below the threshold after injecting the desired amount of humidifying fluid. After delaying the humidifying fluid injection at 318, method 300 may continue from 318 to 320 which comprises determining if the intake air temperature is greater than a threshold.

Alternatively, method 300 may continue to 320 from 316, if it is determined at 316 that the injecting of the humidifying fluid will not result in the knock control fluid level decreasing below the threshold. At 320, the method 300 may comprise determining if the intake is greater than the threshold temperature, where the threshold may represent an intake air temperature at which humidifying fluid upon mixing with the intake air would be evaporated by the intake air. Thus, for intake air temperatures above the threshold at 320, the humidifying fluid may be vaporized by the intake air. If the intake air is sufficiently hot to vaporize the humidifying fluid, then method 300 may continue from 320 to 322 which comprises powering off an evaporation unit (e.g., evaporation unit 138 described above in FIG. 1). If the evaporation unit is already off at 322, then the method 300 at 322 may comprise maintaining the evaporation unit off. Thus, at 322 power may not be supplied to the evaporation unit. In this way, humidifying fluid supplied to one or more fluid injectors (e.g., injectors 170 and/or 166 described above in FIGS. 1-2) may not be evaporated prior to commingling with the intake gasses.

Method 300 may then continue from 322 to 324 which comprises injecting the desired amount of humidifying fluid as a liquid. For example, the method 300 at 324 may comprise injecting liquid water. However, in other examples, the humidifying fluid may contain a mixture of other liquid such as alcohols, cleaning fluids, etc. The humidifying fluid may be supplied to the fluid injectors from the humidifying fluid reservoir. Further the humidifying fluid may be injected by a port injector (e.g., injector 170 described above in FIGS. 1-2), into the engine intake, downstream of a turbocharger compressor (e.g., compressor 114 described above in FIGS. 1-2). However, the humidifying fluid may additionally or alternatively be injected by one or more direct injectors, directly into the engine cylinders.

Returning to 320, if the intake air is less than the threshold, then method 300 may continue from 320 to 326 which comprises powering on the evaporation unit and evaporating the desired amount of humidifying fluid. For example, the controller may power on a heating element (e.g., heating element 135 described above in FIG. 1) of the evaporation unit and may flow the humidifying fluid through the evaporation unit until the humidifying fluid has evaporated (e.g., changed from a liquid phase to a gaseous phase). The fluid may in some examples be pumped from the humidifying fluid reservoir to the evaporation unit by a pump (e.g., pump 171 described above in FIG. 1). In other examples, the fluid may be routed to the evaporation unit under the force of gravity.

After evaporating the desired amount of humidifying fluid at 326, method 300 may continue from 326 to 328 which comprises injecting the desired amount of humidifying fluid as a vapor. As described above with reference to 324, the humidifying fluid may be injected by one or more of a port injector and/or one or more direct injectors.

Further, it should be appreciated that in both 324 and 328, the injecting of the humidifying fluid may be feedback controlled based on a difference between the desired humidity level and the measured humidity level as estimated based on outputs from the intake oxygen sensor. Thus, the controller may continue to inject the humidifying fluid until the measured humidity level of the intake air approximately matches the desired humidity level. Method 300 then returns.

Turning now to FIG. 4, it shows an example method 400 for determining if an injection of the humidifying fluid is desired. Thus, the method 400 may be executed as a sub-routine of method 300 described above in FIG. 3, at 304. Method 400 begins at 402 which comprises determining if fuel injector coking is occurring. For example, the method 400 at 402 may comprise determining if a difference between a commanded fuel injection amount and a measured fuel injection amount is greater than a threshold at 404. The commanded fuel injection amount may be a desired fuel injection amount commanded by the controller to be injected by the fuel injectors. The desired fuel injection amount may be determined based on a driver requested torque, engine load, engine speed, boost pressure, a desired air/fuel ratio, etc. The measured fuel injection amount may be estimated based on a fuel flow meter (e.g., flow meter 242 described above in FIG. 2). If the commanded fuel injection amount differs from the actual measured fuel injection amount by more than a threshold, then it may be determined that injector coking is occurring. When injector coking occurs, fuel injection may be restricted and as such the actual amount of fuel injected into the cylinders by the injectors may be less than desired. Thus, a drop in the actual amount of fuel injected to the cylinders below the commanded amount by more than a threshold may be indicative of fuel injector coking.

As another example, the method 400 at 402 may comprise determining if the intake air humidity has been less than a threshold for more than a duration at 406. An intake air humidity history may be stored in memory of the controller. Thus, the controller may store in memory estimates of the ambient humidity over a duration. If the intake air humidity has been less than the threshold for more than the duration, then it may be determined that fuel injector coking is occurring. The duration may be amount of time, number of engine cycles, number of crankshaft rotations, etc.

As yet another example, the method 400 at 402 may comprise determining if the engine load has remained below a threshold for more than a duration at 408. An engine load history may be stored in memory of the controller. Thus, the controller may store in memory estimates of the engine load over a duration. If the engine load has been less than the threshold for more than the duration, then it may be determined that fuel injector coking is occurring. The duration may be amount of time, number of engine cycles, number of crankshaft rotations, etc.

Thus, in some examples, it may be determined that fuel injector coking is occurring if at least one of the difference between a commanded fuel injection amount and a measured fuel injection amount is greater than a threshold at 404, the intake air humidity has been less than the threshold for more than the duration at 406, and the engine load has been less than the threshold for more than the duration at 408. However, in other examples, it may be determined that fuel injector coking is occurring only when at least two of the difference between a commanded fuel injection amount and a measured fuel injection amount is greater than a threshold at 404, the intake air humidity has been less than the threshold for more than the duration at 406, and the engine load has been less than the threshold for more than the duration at 408. In other examples, it may be determined that fuel injector coking is occurring only when all of the difference between a commanded fuel injection amount and a measured fuel injection amount is greater than a threshold at 404, the intake air humidity has been less than the threshold for more than the duration at 406, and the engine load has been less than the threshold for more than the duration at 408.

Thus, if it is determined at 402 that fuel injector coking is occurring, then method 400 may continue from 402 to 410 which comprises concluding that humidification of the intake air is desired. Thus, it may be desired to humidify the intake air when fuel injector coking is occurring. As such, the humidifying fluid may be injected into the intake air to humidify the intake air when it is determined that fuel injector coking is occurring. Method 400 then returns.

However, if at 402 it is determined that fuel injector coking is not occurring, then method 400 may continue from 402 to 412 which comprises determining if a duration has expired since a most recent humidifying fluid injection. In some examples, the duration may be a pre-set amount of time. In some examples, it may be determined that fuel injector coking is not occurring if all of the difference between a commanded fuel injection amount and a measured fuel injection amount is not greater than a threshold at 404, the intake air humidity has not been less than the threshold for more than the duration at 406, and the engine load has not been less than the threshold for more than the duration at 408. However, in other examples, it may be determined that fuel injector coking is not occurring only when at least two of the difference between a commanded fuel injection amount and a measured fuel injection amount is not greater than a threshold at 404, the intake air humidity has not been less than the threshold for more than the duration at 406, and the engine load has not been less than the threshold for more than the duration at 408. In other examples, it may be determined that fuel injector coking is occurring when one of the difference between a commanded fuel injection amount and a measured fuel injection amount is not greater than a threshold at 404, the intake air humidity has not been less than the threshold for more than the duration at 406, and the engine load has not been less than the threshold for more than the duration at 408.

If more than the duration since the most recent injection of the humidifying fluid has passed, then method 400 may continue from 412 to 410 and conclude that humidification of the intake air is desired. Method 400 then returns.

However, if the duration since the most recent injection of the humidifying fluid has not passed, then method 400 may continue from 412 to 414 which comprises concluding that humidification of the intake air is not desired. As such, it may not be desired to inject the humidifying fluid. Method 400 then returns.

Continuing to FIG. 5, it shows an example method 500 for regulating fluid levels in the humidifying fluid reservoir. Method 500 begins at 502 which comprises collecting condensation in a condensation unit (e.g., condensation unit 195 described above in FIG. 1) and flowing the collected liquid from the condensation unit to the humidifying fluid reservoir. Thus, the collecting the condensation may comprise separating liquids from gas in the fluids of the condensation unit. Said another way, the method 500 at 502 may comprise condensing fluid in the condensation unit. For example, the liquids may separate from the gasses in the condensation unit due to the force of gravity. Thus, the liquids may collect near a bottom, with respect to the ground in an on-road vehicle, of the condensation unit. In some examples, the liquid collected in the condensation unit may be water. The liquid may in some examples be pumped to the humidifying fluid reservoir from the condensation unit. However, in other examples, the liquid may be drawn to the humidifying fluid reservoir under the force of gravity.

Method 500 may then continue from 502 to 504 which comprises determining if the fluid levels in the humidifying fluid reservoir are greater than a higher first threshold. The higher first threshold may represent a fluid level in the reservoir where the reservoir is substantially full. Thus, if the fluid levels in the reservoir are greater than the threshold at 504, then method 500 may continue from 504 to 506 which comprises reducing an amount of liquid flowing from the condensation unit to the humidifying fluid reservoir. In some example, the liquid flow may be reduced by a pre-set amount. For example, the liquid flow may be reduced to substantially zero, such that substantially no liquids flow from the condensation unit to the fluid reservoir. Thus in some examples, flow into the humidifying fluid reservoir may be halted when the fluid level increases above the threshold. However, in other examples, the fluid flow may be reduced to above a zero flow rate, such that some liquid still flows into the humidifying fluid reservoir. In yet further examples, in amount of liquid flowing from the condensation unit to the humidifying fluid reservoir may be adjusted based on an amount of humidifying fluid leaving the humidifying fluid reservoir for injection into the engine intake and/or based on predicted future humidifying fluid injection events. Thus, if an injection of the humidifying fluid is imminent, then liquid flow into the reservoir may continue. Method 500 then returns.

Returning to 504, if it is determined that the fluid levels in the humidifying fluid reservoir are not greater than the threshold, then method 500 may continue from 504 to 508 which comprises determining if the fluid levels in the humidifying fluid reservoir are less than a lower second threshold. If the fluid levels are not less than the lower second threshold, then method 500 may continue from 508 to 510 which comprises continuing to flow liquid from the condensation unit to the humidifying fluid reservoir. Method 500 then returns.

However, if at 508 it is determined that the fluid levels in the reservoir are less than the lower second threshold, then method 500 may continue from 508 to 512 which comprises flowing fluid from a windshield wiper reservoir (e.g., wiper fluid reservoir 76 described above in FIGS. 1-2). Thus, in some examples, fluid from a windshield wiper system may be used as the humidifying fluid for humidifying the intake air.

Method 500 may continue from 512 to 514 which comprises determining if humidification of the intake air is desired in the same or similar manner to that previously described above with reference to 304 of method 300 in FIG. 3. If humidification of the intake air is desired, then method 500 may continue from 514 to 516 which comprises flowing liquid out of the humidifying fluid reservoir towards one or more injectors (e.g., injectors 170 and 166 described above in FIGS. 1-2) and/or an evaporation unit (e.g., evaporation unit 138 described above in FIG. 1). In some examples, the method 500 at 516 may comprise pumping the humidifying fluid towards the one or more injectors and/or evaporation unit. However, in other examples, the fluid may be drawn towards the one or more injectors and/or evaporation unit under the force of gravity. Method 500 then returns.

However, if at 514 it is determined that humidification of the intake air is not desired, then method 500 may continue from 514 to 518 which comprises powering off a humidifying fluid reservoir pump (e.g., pump 171 described above in FIG. 1). Thus, when it is not desired to humidify the intake air, then the pump may be powered off, and substantially no additional humidifying fluid may be supplied to the one or more injectors and/or evaporation unit. Method 500 then returns.

In one representation a system may be included for removing coking deposits from at least one injection nozzle of an Otto-cycle, in particular of a motor vehicle, by means of which at least one injection nozzle a fuel can be injected directly into a combustion chamber of the Otto-cycle engine, it being possible for the Otto-cycle engine to be supplied with intake air via at least one intake unit which serves exclusively for conducting intake air.

In another representation a motor vehicle may comprise at least one Otto-cycle engine which has at least one injection nozzle by means of which a fuel can be injected directly into a combustion chamber of the Otto-cycle engine, and having at least one intake unit which serves exclusively for conducting intake air and by means of which intake air can be supplied to the Otto-cycle engine.

In a further representation, a method for removing coking deposits from at least one injection nozzle of an Otto-cycle engine is included, by means of which at least one injection nozzle a fuel can be injected directly into a combustion chamber of the Otto-cycle engine.

A technical effect of reducing coking deposits on one or more fuel injectors is achieved by humidifying the intake air. In one example, the intake air may be humidified with water. Through the targeted activation of the humidification unit, it is possible for the intake air to be humidified with water, and for the air humidity of the intake air to be increased such that the deposits are reduced, or are entirely removed from the at least one injection valve. The activation of the humidification unit, or the humidification, according to at least one embodiment of the present disclosure, of the intake air with water, may be performed at regular time intervals and/or in a manner dependent on certain environmental or vehicle parameters. The humidification unit may be activated over a time period of predefinable length for the purpose of humidifying the intake air. It is thus possible for corresponding cleaning of an injection nozzle to be performed even in an Otto-cycle engine that is operated virtually exclusively in an environment with low air humidity. Consequently, an increase in particle emissions of the Otto-cycle engine can be prevented in an effective manner, such that the operation of the Otto-cycle engine is optimized with regard to its particle emissions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A system for removing coking deposits from at least one injection nozzle of an Otto-cycle engine, the at least one injection nozzle configured to inject fuel directly into a combustion chamber of the Otto-cycle engine, where the Otto-cycle engine receives intake air via at least one intake unit which serves exclusively for conducting intake air, and where the at least one intake unit includes a humidification unit, which when activated, injects a humidifying fluid into intake air flowing through the at least one intake unit with water, wherein the humidification unit has at least one evaporator or atomizer which evaporates or atomizes the humidifying fluid prior to injection of the humidifying fluid into the intake air in response to a temperature of the intake air decreasing below a threshold.

2. The system of claim 1, further comprising at least one liquid reservoir which is connected in fluid-conducting fashion to the humidification unit.

3. The system of claim 2, further comprising at least one condensation unit connected in fluid-conducting fashion to the liquid reservoir, where the condensation unit generates condensation water and supplied the water to the liquid reservoir.

4. The system of claim 2, wherein the liquid reservoir is connected in a fluid-conducting fashion to a windshield washer system.

5. The system of claim 1, further comprising at least one electronics unit electrically coupled to the humidification unit, whereby operation of the humidification unit, including temporary activation thereof, is controlled by the electronics unit.

6. The system of claim 1, further comprising an intake oxygen sensor, wherein humidification of the intake air via the humidification unit is feedback controlled based on outputs from the intake oxygen sensor.

7. A method for removing coking deposits from at least one injection nozzle of an Otto-cycle engine, by means of which at least one injection nozzle a fuel can be injected directly into a combustion chamber of the Otto-cycle engine, comprising evaporating water into water vapor, and then temporarily humidifying intake air of the Otto-cycle engine by injecting the water vapor into the intake air during operation of the Otto-cycle engine.

8. The method of claim 7, wherein the water used for humidifying the intake air is generated by at least one condensation unit of a motor vehicle.

9. The method of claim 7, wherein the water used for humidifying the intake air is contained in a windshield washer system of a motor vehicle.

10. A method comprising:
humidifying intake air of an intake system of an engine in response to a determination that fuel injector coking is occurring, or after a duration has passed since a most recent humidification event; and
adjusting a desired amount of humidifying fluid to be injected into engine intake air based on an amount of knock control fluid injected into one or more combustion chambers of the engine.

11. The method of claim 10, wherein the humidifying the intake air comprises injecting the humidifying fluid into the engine intake air, and wherein a degree of humidifying is adjusted responsive to a degree of fuel injector coking.

12. The method of claim 11, further comprising routing the humidifying fluid through an evaporation unit and evaporating the humidifying fluid prior to the injecting the humidifying fluid, in response to a temperature of the intake air decreasing below a threshold, and then injecting the humidifying fluid in a gaseous state into the intake air.

13. The method of claim 11, wherein the injecting comprises injecting the humidifying fluid in liquid form into the intake air in response to a temperature of the intake air increasing above a threshold.

14. The method of claim 10, further comprising, determining whether fuel injector coking is occurring based on one or more of a difference between a commanded fuel injection amount and a measured fuel injection amount, an ambient humidity level, and an engine load.

15. The method of claim 10, further comprising condensing fluid in one or more of an EGR cooler, air conditioning condenser, and radiator, and storing the condensed fluid in a liquid reservoir for injection into the intake air.

16. The method of claim 10, further comprising determining the desired amount of humidifying fluid to be injected into the intake air based on a desired humidity level, where the desired humidity level is determined based on one or more of an amount of fuel injector coking, duration since a most recent humidifying fluid injection, intake air temperature, spark timing, boost pressure, and EGR flow rate.

17. The method of claim 10, further comprising, not humidifying the intake air when it is determined that humidifying the intake air would result in a decrease of knock control fluid levels below a threshold.

* * * * *